(12) United States Patent
Horii et al.

(10) Patent No.: US 8,395,741 B2
(45) Date of Patent: Mar. 12, 2013

(54) LCD APPARATUS

(75) Inventors: Masatoshi Horii, Tokyo (JP); Nobuyuki Kobayashi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 287 days.

(21) Appl. No.: 12/783,547

(22) Filed: May 19, 2010

(65) Prior Publication Data

US 2010/0296014 A1    Nov. 25, 2010

(30) Foreign Application Priority Data

May 19, 2009    (JP) ................. 2009-121426

(51) Int. Cl.
*G02F 1/1343* (2006.01)
(52) U.S. Cl. ..................................... 349/142
(58) Field of Classification Search ............ 349/142
See application file for complete search history.

(56) References Cited

U.S. PATENT DOCUMENTS 3,853,392 A * 12/1974 Fergason ............ 349/154

FOREIGN PATENT DOCUMENTS

| CH | 627041 A | * 12/1981 | .......... 349/142 |
| JP | 05-203997 A | 8/1993 | |

* cited by examiner

*Primary Examiner* — James Dudek
(74) *Attorney, Agent, or Firm* — Kenealy Vaidya LLP

(57) ABSTRACT

The disclosed subject matter can include an LCD apparatus having a high visual quality. The LCD apparatus can include a first substrate including a plurality of first electrodes connecting to first wiring lines that are located on a first surface thereof, and a second substrate including a plurality of second electrodes connecting to second wiring lines that are located on a second surface thereof. A liquid crystal layer can be disposed between the first and second surfaces, wherein at least one of the first wiring lines partially intersects with at least one of the second wiring lines. Impedance variations among the first and second electrodes can be reduced by adjusting the area of an intersecting region of the wiring lines, and thereby display variations among display patterns between the first and second electrodes can be reduced. Thus, the disclosed subject matter can provide an LCD apparatus having a high visual quality.

20 Claims, 13 Drawing Sheets

FIG. 5

|  | Resistance of wiring line | Display area | Effective voltage | Effective voltage ratio | Display variation |
|---|---|---|---|---|---|
| com1 | 6500 | 84.9 | 3.24 | 0.98 | ○ |
| com2 | 3100 | 83.1 | 3.29 | 1.00 | ○ |
| com3 | 4200 | 61.0 | 3.29 | 1.00 | ○ |
| com4 | 3800 | 37.0 | 3.31 | 1.00 | ○ |
| com5 | 4000 | 39.5 | 3.31 | 1.00 | ○ |
| com6 | 1800 | 120.0 | 3.30 | 1.00 | — |
| com7 | 3900 | 98.0 | 3.27 | 0.99 | ○ |
| com8 | 3200 | 209.7 | 3.22 | 0.98 | ○ |
| com9 | 3000 | 65.9 | 3.30 | 1.00 | ○ |

| Reference | com6 | 1800 | 61.7 | 3.32 | 1.00 | — |

FIG. 6

|  | Resistance of wiring line | Display area | Effective voltage | Effective voltage ratio | Display variation |
|---|---|---|---|---|---|
| com1 | 6500 | 84.9 | 3.24 | 0.98 | ○ |
| com2 | 3100 | 83.1 | 3.29 | 1.00 | ○ |
| com3 | 4200 | 61.0 | 3.29 | 1.00 | ○ |
| com4 | 3800 | 37.0 | 3.31 | 1.00 | ○ |
| com5 | 4000 | 39.5 | 3.31 | 1.00 | ○ |
| com6 | 3500 | 61.7 | 3.30 | 1.00 | — |
| com7 | 3900 | 98.0 | 3.27 | 0.99 | ○ |
| com8 | 3200 | 209.7 | 3.22 | 0.98 | ○ |
| com9 | 3000 | 65.9 | 3.30 | 1.00 | ○ |

| Reference | com6 | 1800 | 61.7 | 3.32 | 1.00 | — |

1

LCD APPARATUS

This application claims the priority benefit under 35 U.S.C. §119 of Japanese Patent Application No. 2009-121426 filed on May 19, 2009, which is hereby incorporated in its entirety by reference.

BACKGROUND

1. Field

The presently disclosed subject matter relates to a liquid crystal display (LCD) apparatus, and more particularly to an LCD apparatus having a high visual quality, which allows wiring lines to have reduced impedance variations among electrodes connecting to the wiring lines for driving a liquid crystal layer disposed between respective electrodes, and thereby reducing display variations among display patterns (pixels in a matrix type LCD) in a segment type LCD.

2. Description of the Related Art

Segment type LCD apparatuses have been used as a display apparatus for various equipment such as home electric appliances, office automation equipment, automobile parts, etc. One of the reasons is that the segment type LCD apparatuses enable a single segment to form a display pattern in various shapes at low cost as compared to a matrix type LCD apparatus.

In the segment type LCD apparatuses, the display pattern can be formed between transparent electrodes (a common electrode and a segment electrode), which are respectively provided on two transparent substrates (e.g. glass substrates). Specifically, a desired display pattern can be formed by patterning a segment electrode in the desired shape on a transparent substrate and by patterning a common electrode corresponding to the segment electrode on another transparent substrate.

In this case, the segment electrode and the common electrode are connected to wiring lines, which receive a power supply therebetween. Each of the wiring lines can be formed by patterning the respective wiring lines along with the segment electrode and the common electrode on their transparent substrates, respectively. In general, each of the wiring lines for the segment electrode and the common electrode is located so as not to overlap with respect to each other. That is typically done to prevent an undesired display (lighting) in a region where the wiring line for the segment electrode intersects with the wiring line for the common electrode.

When a display density of the display patterns and the like is high due to many segments in LCD apparatuses such as the segment type LCD apparatus, a character type LCD apparatus, a graphic type LCD apparatus and so on, an available area for each of the wiring lines connecting to the segment electrodes and the common electrodes becomes very small. Thus, each of the widths of the wiring lines is typically reduced. The wiring lines are generally formed of transparent oxide semiconductors such as ITO, for which resistivity is approximately $10^{-4}$ ohm cm and therefore is high as compared to a wiring line that is made of a metal.

Consequently, the narrower each width of the wiring lines is, the higher that each of the resistance values of the wiring lines is. As a result, a voltage applied between the segment electrode and the common electrode may be reduced, because not only are there voltage drops between both ends of the wiring lines connecting to the segment electrodes (which voltage drops can be high) but there are also voltage drops between both ends of the wiring lines connecting to the common electrodes (which also can be high).

In the segment type LCD apparatuses, because each shape of the wiring lines (for example, the lengths and widths of the wiring lines) connecting to the common electrodes may be different, each of the resistance values between both ends of the wiring lines can be different. The resistance differential of the wiring lines may cause differing variations among voltages applied to the common electrodes. Each of the shapes of the wiring lines connecting to the segment electrodes may also cause variations among voltages applied to the segment electrodes due to the same above-described reason.

The variations among the applied voltages may cause differing variability of optical transmittance among display patterns of a liquid crystal layer, which is disposed between the segment electrodes and the common electrodes. The transmittance differential may cause differing display variations such as in brightness, color tone and the like among the display patterns. The variations among the display patterns may also result in degradation of the visual quality of the display as a whole.

In order to prevent this variation between the pixels (the display patterns in the segment type LCD), a conventional LCD apparatus shown in FIG. 13 is disclosed in patent document No. 1 (Japanese Patent Application Laid Open H05-203997). The conventional LCD apparatus includes pixel electrodes 56a and 56b, and wiring lines 52a and 52b that extend from the pixel electrodes 56a and 56b toward a peripheral region thereof, respectively. In addition, compensating electrodes 50a and 50b are located between the peripheral region and the pixel electrodes 56a-56b and are located on the opposite side of the wiring lines 52a and 52b via a liquid crystal.

In this case, the large compensating electrode 50a is located on the opposite side of the short wiring line 52a, and the small compensating electrode 50b is located on the opposite side of the long wiring line 52b. That is, a large capacitance of the liquid crystal is formed on the short wiring line 52a of which resistance value is small, and a small capacitance of the liquid crystal is formed on the long wiring line 52b of which resistance value is large.

Therefore, even when the respective resistance values of the wiring lines 52a and 52b are different due to their lengths, their resistance values may substantially become equal to each other because the compensating capacitances of the liquid crystal on the short wiring line 52a and the long wiring line 52b may compensate for their resistance differential.

The above-referenced Patent Document is listed below and is hereby incorporated with its English abstract in its entirety.
1. Patent document No. 1: Japanese Patent Application Laid Open H05-203997

However, the conventional LCD apparatus does not only need the regions for the pixel electrodes to control the LCD display but also needs new regions for the compensating electrodes. In addition, shapes of the compensating electrodes respectively are typically adjusted in accordance with the respective shapes of the wiring lines, because overlapping areas between the compensating electrodes and the wiring lines are individually adjusted. Thus, in the conventional LCD apparatus, there are problems in that, for example, the structure may become complex and large.

The disclosed subject matter has been devised to consider the above and other problems, characteristics and features. Thus, an embodiment of the disclosed subject matter can include an LCD apparatus having a high visual quality and a simple structure. In this case, each of the effective voltages applied to display patterns (pixels) of the LCD apparatus can be adjusted without additional compensating electrodes by adjusting impedances among the display patterns (the pixels)

with wiring lines. Thus, the LCD apparatus can result in a high visual quality with a simple structure. In addition, the LCD apparatus can be driven by a simple driving circuit as usual.

SUMMARY

The presently disclosed subject matter has been devised in view of the above and other characteristics, desires, and problems in the conventional art, and to make certain changes and improvements to existing LCD apparatus using wiring lines. An aspect of the disclosed subject matter can include providing an LCD apparatus including a non-display area around a display area that can provide high visual quality as a display apparatus for various equipment and can have a simple structure. Another aspect of the disclosed subject matter can include providing LCD apparatuses, wherein the non-display area can be reduced and the display area can perform a premium accent as well as provide high visual quality.

According to an aspect of the disclosed subject matter, an LCD apparatus including a non-display area around a display area can include: a first transparent substrate that includes a plurality of first electrodes and a plurality of first wiring lines, the plurality of first electrodes arranged on the display area that is located on a first surface of the first transparent substrate, each of the first electrodes connecting to the plurality of first wiring lines, and each of the first wiring lines extending to the non-display area that is located on the first surface to receive an alternative voltage; and a second transparent substrate that includes a plurality of second electrodes and a plurality of second wiring lines, and the second transparent substrate located so that a second surface of the second transparent substrate can face the first surface of the first transparent substrate, the plurality of second electrodes arranged on the display area that is located on the second surface, each of the second electrodes connecting to the plurality of second wiring lines, and each of the second wiring lines extending to the non-display area that is located on the second surface to receive the alternative voltage along with the corresponding first wiring line.

In addition, a liquid crystal layer can be disposed between the first surface of the first transparent substrate and the second surface of the second transparent substrate, wherein one or more of the first wiring lines partially intersect with at least one of the second wiring lines that is associated with the first wiring lines.

In the above-described exemplary LCD apparatus, intersecting regions of the first wiring lines and the second wiring lines can be located on the display area, and each shape of the intersecting regions can be substantially a rectangular shape in which at least one of four sides is less than 100 micrometers. The intersecting regions can also be located on the non-display area. In addition, the LCD apparatus can further include a shield mask that is located over at least the intersecting regions through the first transparent substrate or the second transparent substrate. The alternative voltage can be a passive matrix driving voltage, and the liquid crystal layer can also be configured to perform a segment type display.

According to the above-described exemplary LCD apparatus, each of the effective voltages applied to display patterns (pixels in a matrix type LCD) in a segment type LCD of the LCD apparatus can be adjusted by adjusting the number of the intersecting areas and their sizes, because impedance between the corresponding electrodes can be adjusted. Thus, the LCD apparatus can reduce visual variation among the display patterns in the segment type LCD and/or among the pixels in the matrix type LCD. In this case, when each shape of the intersecting regions can be substantially a rectangular shape in which at least one of four sides is less than 100 micrometers, it is difficult for the human eye to recognize the intersecting regions due to very small points. When the shape becomes a large size such that the human eye can recognize the shape, the large intersecting region can be located on the non-display area so as to be able to cover at least the region.

According to another aspect of the disclosed subject matter, an LCD apparatus can include: a first transparent substrate including a first peripheral region and a plurality of first electrodes that are located on a first surface of the first transparent substrate; a plurality of first wiring lines having a first node, a first terminal and a first width, each of the first nodes thereof connecting to the first electrodes of the first transparent substrate, and each of the first terminals thereof extending to the first peripheral region of the first transparent substrate to receive an alternative voltage; a second transparent substrate including a second peripheral region and a plurality of second electrodes that are located on a second surface of the second transparent substrate, and the second transparent substrate being located so that the second surface faces the first surface of the first transparent substrate; and a plurality of second wiring lines having a second node, a second terminal and a second width, each of the second nodes thereof connecting to the second electrodes of the second transparent substrate, and each of the second terminals of the second wiring lines extending to the second peripheral region of the second transparent substrate to receive the alternative voltage along with the corresponding first wiring line.

In addition, a liquid crystal layer can be disposed between the first surface of the first transparent substrate and the second surface of the second transparent substrate, wherein one or more of the first wiring lines partially intersects with at least one of the second wiring lines associating with the first wiring lines, and an effective voltage applied between the first electrode connected to the one or more of the first wiring lines and the second electrode connected the at least one of the second wiring lines is substantially equal to at least one effective voltage applied between other first electrodes and the corresponding second electrodes.

In the above-described exemplary LCD apparatus, descriptions of the characteristics set forth in paragraph [0019] above can also basically apply. In this case, the shape of the intersecting areas is not limited to the rectangular shape. In addition, at least one of the first widths of the first wiring lines can change between the first node of the at least one first wiring line and the corresponding first terminal and/or at least one of the second widths of the second wiring lines can change between the second node of the at least one second wiring line and the corresponding second terminal.

Therefore, the LCD apparatus can reduce the non-display area and can make best use of the display area. In addition, each of the effective voltages applied to the display patterns in the segment type LCD and/or applied to the pixels in the matrix type LCD of the LCD apparatus can be adjusted at substantially the same voltage by adjusting each shape of the wiring lines as well as the number of the intersecting areas and their sizes. Furthermore, a block of display patterns highlighted in the display area can also be adjusted at a higher voltage than that of other display patterns. Thus, the disclosed subject matter can provide LCD apparatus having a high visual quality with a simple structure, which can be driven by a simple driving circuit as usual.

BRIEF DESCRIPTION OF THE DRAWINGS

These and other characteristics and features of the disclosed subject matter will become clear from the following description with reference to the accompanying drawings, wherein:

FIG. 5 is a table showing a simulation result for a relation of the effective voltage ratio and display variations with respect to different display areas and the wiring lines with reference to com6, in which a resistance value of the wiring line is 1800 ohms and the display area is 120 mm$^2$;

FIG. 6 is a table showing the simulation result for the relation of the effective voltage ratio and the display variations with respect to the different display areas and the wiring lines with reference to com6, in which the resistance value of the wiring line is 3500 ohms and the display area is 61.7 mm$^2$;

DETAILED DESCRIPTION OF EXEMPLARY EMBODIMENTS

The disclosed subject matter will now be described in detail with reference to FIGS. 1 to 12. Inventors of the disclosed subject matter prospected a correlation between two parameters of a display area and a resistance value of a wiring line when a display variation between display patterns occurs in an LCD display. As a result, the inventors developed a structure to prevent the display variation in accordance with the prospecting result.

Thus, the prospecting result will now be given in order to facilitate an understanding for LCD apparatuses of the disclosed subject matter. Accordingly, an exemplary embodiment of the disclosed subject matter will be described in detail below.

Figure 1:
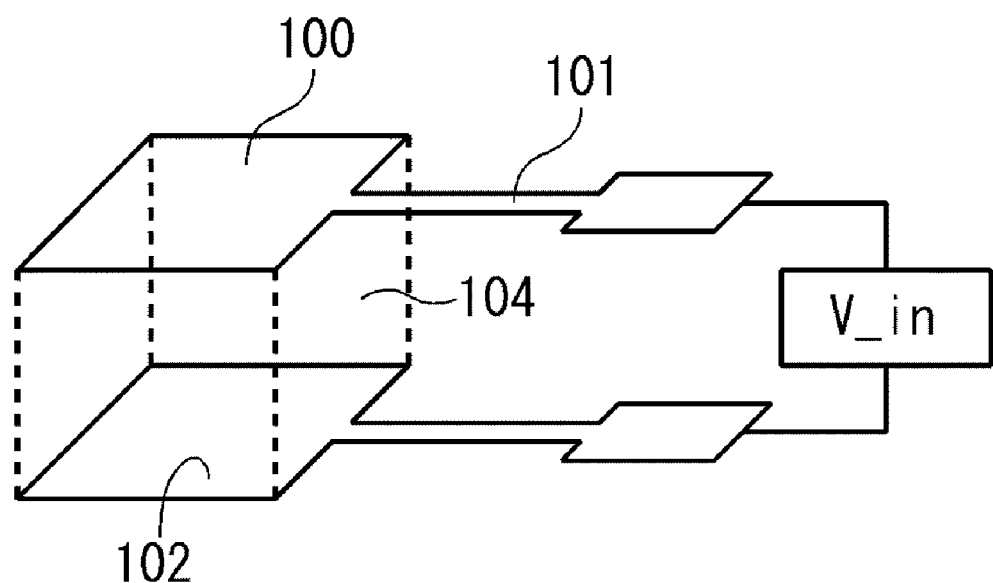
FIG. 1 is a schematic perspective view showing a liquid crystal cell of a simulation model used for a prospective research with respect to a display variation between display patterns.

FIG. 1 is a schematic perspective view showing a liquid crystal cell of a simulation model, which was used for prospective research with respect to display variation between display patterns. The simulation model includes: a common electrode 100, a wiring line 101 connecting to the common electrode 100, a segment electrode 102 that is located on the opposite side of the common electrode 100, and a liquid crystal layer 104 that is disposed between the common electrode 100 and the segment electrode 102.

Figure 2:
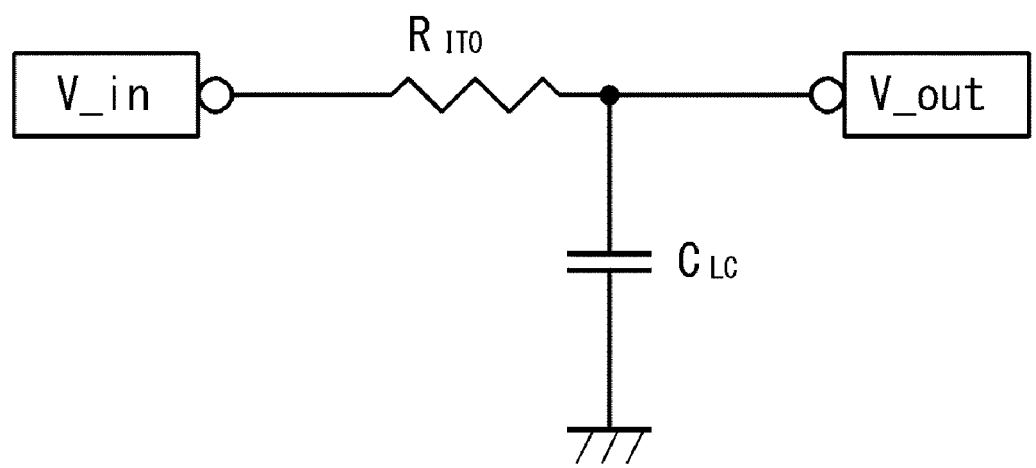
FIG. 2 is an equivalent circuit diagram of the simulation model shown in FIG. 1.

FIG. 2 is an equivalent circuit diagram of the simulation model shown in FIG. 1, in which V-in, $R_{ITO}$ and $C_{LC}$ are shown as a voltage applied from a power supply, a resistance of the wiring line 101 and a capacity of the liquid crystal layer 104, respectively. V-out is shown as a voltage (hereinafter referred to as "effective voltage") that is supplied between the common electrode 100 and the segment electrode 102.

Parameters in addition to the above-described values can include, a duty ratio (1/D) of a passive matrix driving waveform, a bias ratio (1/b), a driving frequency f (Hz), a shape of the waveform, a display area of the liquid crystal layer and a relative permittivity of the liquid crystal material, which can be used for the computer simulation. A waveform shape such a rise time, a fall time and the like that is applied to the common electrode 100 can be calculated by using the above-described parameters, and the effective voltage can be calculated by the computer simulation.

Here, the effective voltage Von-rms is simulated in accordance with formula 1 described below. In this case, the capacity $C_{LC}$ of the liquid crystal layer 104 can be calculated in accordance with the liquid crystal layer having the relative permittivity of 5.1 and a width of 4 micrometers and in accordance with the display area of the liquid crystal layer that is the electrode area of the common electrode 100. The resistance $R_{ITO}$ of the wiring line 101 can be changed as 2500, 4500 and 6500 ohms, and the driving condition can be based upon the duty ratio of 1/64, the bias ratio of 1/9 and the driving frequency of 120 Hz.

$$\text{Von\_rms} = \sqrt{f * \left[ \int_0^{1/(f*D)} \{Vs(t)\}^2 \, dt + \int_{1/(f*D)}^{1/f} \{Vns(t)\}^2 \, dt \right]} \quad \text{[Formula 1]}$$

In the above-described formula 1, a section period voltage Vs (t) and a non-section period voltage Vns (t) are realized as shown below. Here, the section period is referred to as $0 \leq t \leq (1/(f \times D))$, and the non-section period is referred to as $(1/(f \times D)) \leq t \leq (1/f)$. Vo is a peak voltage of the driving voltage.

$$Vs(t) = V_0 - (V_0 + V_0/b) * \exp\{-t/(R_{ITO} * C_{LC})\} \quad \text{[Formula 2]}$$

$$Vns(t) = V_0/b + [V_0 - (V_0 + V_0/b) * \exp\{-1/(f*D*R_{ITO}*C_{LC})\} - V_0/b] * \exp[\{-t + (1/(f*D))\}/(R_{ITO}*C_{LC})] \quad \text{[Formula 3]}$$

Figure 3:
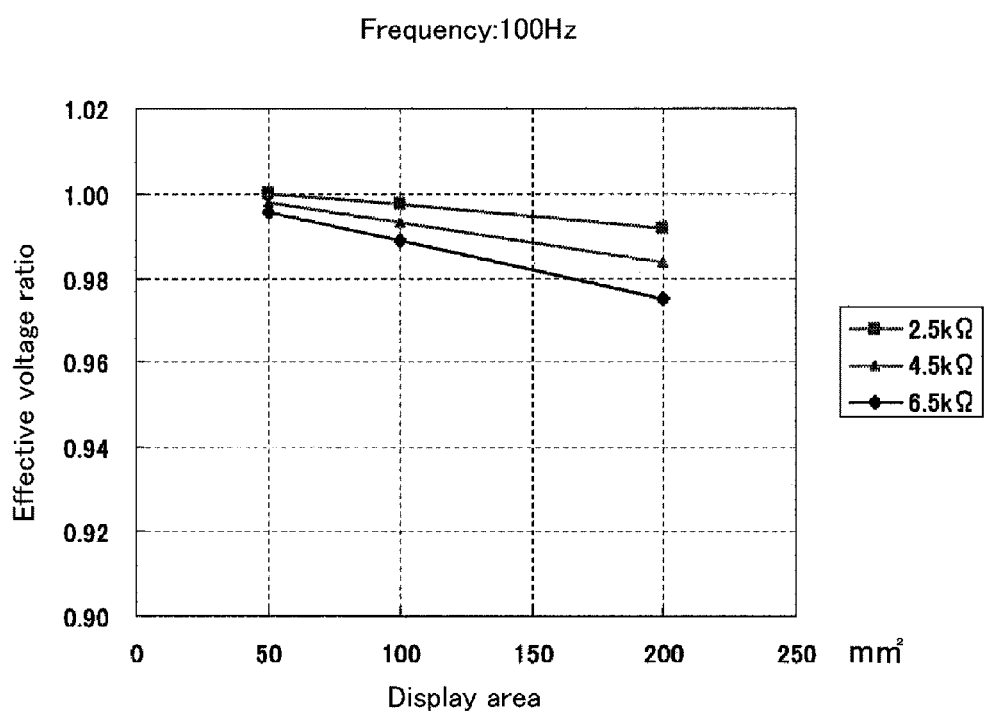
FIG. 3 is a diagram showing a relation of resistance values of wiring lines and an effective voltage ratio at a constant frequency of 100 Hz with respect to display areas of the liquid crystal cell in accordance with the simulation model shown in FIG. 1.
Figure 4:
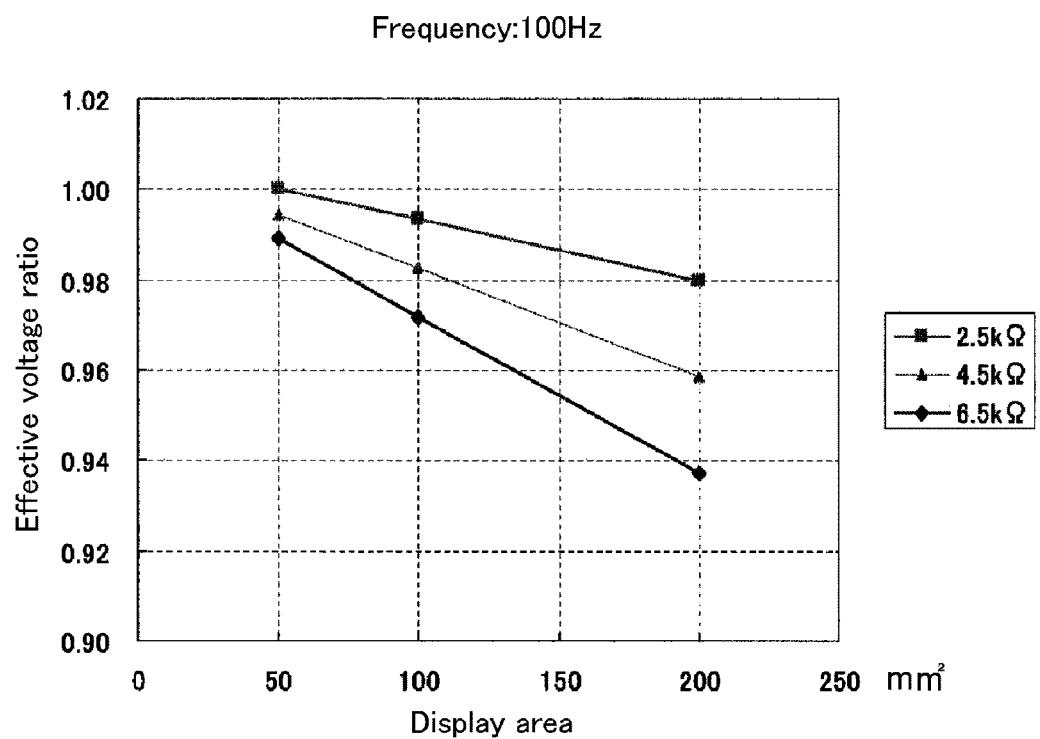
FIG. 4 is a diagram showing a relation of the resistance values of the wiring lines and the effective voltage ratio at the constant frequency of 250 Hz with respect to the display areas of the liquid crystal cell in accordance with the simulation model shown in FIG. 1.

FIGS. 3-4 show results of the computer simulation with respect to a relation between the effective voltage ratio and the display area when the display area of the liquid crystal layer is changed in accordance with the above-described simulation model. In this case, the reference value of the effective voltage ratio is defined as the effective voltage when the resistance value of the wiring line is 2500 ohms and the display area is 50 mm$^2$. As the simulation result shown in FIGS. 3 and 4, the larger the resistance value of the wiring line is, the smaller the effective voltage ratio is, that is, the effective voltage ratio becomes farther from the reference value. The larger the display area is, the smaller the effective voltage ratio is.

When comparing the simulation result of FIG. 3 with that of FIG. 4, the higher the driving frequency is, the larger the decrease of the effective voltage ratio with respect to the display area is. Accordingly, the display variation between the display patterns can be improved by determining an appropriate effective voltage ratio while using such a parameter as the display area or the resistance of the wiring line.

FIGS. 5-6 are tables showing simulation results for a relation of the effective voltage ratio and the display variation with respect to different display areas and wiring lines. Com1 to com 9 mean a plurality of common electrodes in which areas are different, that is, their display areas are different. Thus, the respective resistance values of the wiring lines that connect to the plurality of common electrodes are different. In FIGS. 5 and 6, comb is determined as the reference, and a relation between the display variation and the display area and/or a relation between the display variation and the resistance of the wiring line are referred.

In the simulation result shown in FIG. 5, the reference is com6 in which the resistance value of the wiring line is 1800 ohms and the display area is 61.7 mm$^2$. When the display area of com6 is changed from 61.7 mm$^2$ to 120.0 mm$^2$ while the resistance value of the wiring line is the same, the effective voltage of com6 changes from 3.32V to 3.30V. Various combinations of the resistances of the wiring lines and the display areas are selected within the range of the resistance values of 1800 to 6500 ohms so that the effective voltages of com1-com6 can become approximately 3.30V, and their effective voltage ratios are simulated in accordance with the above-described simulation model. Thus, the display variations can improve because the effective voltage ratios of com1-com6 are within the range of 0.98 to 1.00.

In the simulation result shown in FIG. 6, the reference is also com6 in which the resistance value of the wiring line is 1800 ohms and the display area is 61.7 mm$^2$. When the resistance value of the wiring line of com6 is changed from 1800 ohms to 3500 ohms while the display area remains at the same value, the effective voltage of com6 changes from 3.32V to 3.30V. The improvement of the display variations is shown in the simulation result of FIG. 6 as well as that of FIG. 5.

According to the above-described prospective research, variations of the effective voltages among a plurality of common electrodes can be reduced by adjusting at least one of the display area and the resistance value of the wiring line, and therefore the display variation among the display patterns can be improved by the adjustment. An exemplary embodiment of an LCD apparatus made in accordance with the prospective research will now be described in detail.

Figure 7:
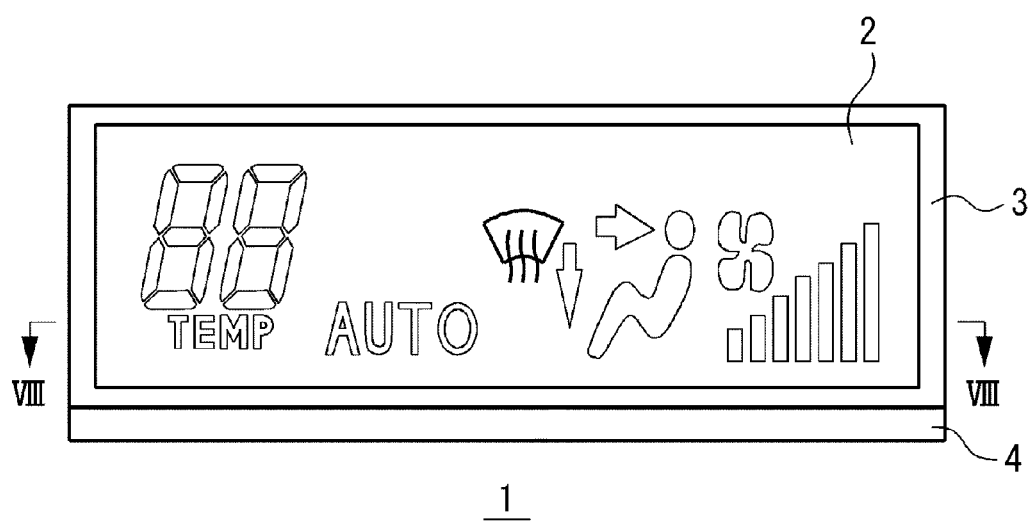
FIG. 7 depicts an exemplary embodiment of an LCD apparatus made in accordance with principles of the disclosed subject matter.

FIG. 7 shows an exemplary embodiment of an LCD apparatus made in accordance with principles of the disclosed subject matter. The LCD apparatus 1 can include a display area 2, a non-display area 3 that is provided on a fringe of the display area 2 in a circular (or other) shape, and a terminal portion 4 including a plurality of terminals that provide the display area 2 with a driving signal from an outside circuit. The display area 2 is a segment type LCD as shown in FIG. 7 and can be used for an automotive or vehicle information display, or other type of display.

Figure 8:
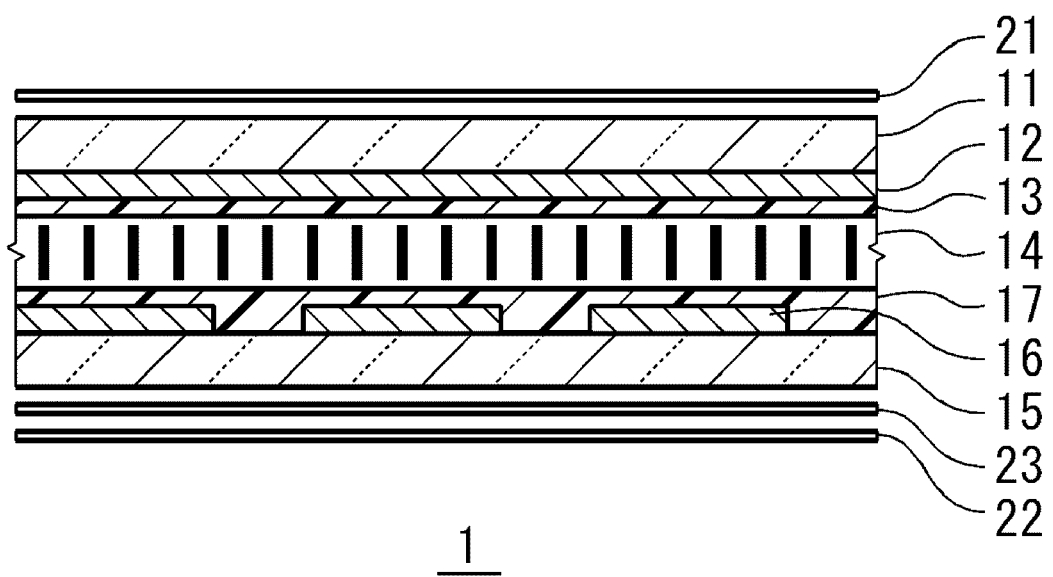
FIG. 8 is a partial cross-section view showing a cross-section taken along line VIII-VIII of the embodiment shown in FIG. 7.

FIG. 8 is a partial cross-section view showing a cross-section taken along line VIII-VIII of the embodiment shown in FIG. 7. The LCD apparatus 1 can include a first transparent substrate 11 and a second transparent substrate 15 that are located so as to face with respect to each other, and can include a liquid crystal layer 14 that is disposed between the first transparent substrate 11 and the second transparent substrate 15. The liquid crystal layer 14 can be sealed with a seal material, which is disposed between ends of both substrates 11 and 15.

The first transparent substrate (a common substrate) 11 can be made of a transparent plate such as a glass plate, a plastic board, etc. The second transparent substrate (a segment substrate) 15 can also be made of the transparent plate similar to or identical to the first transparent substrate 11. As shown in FIG. 8, a first electrode (a common electrode) 12 and a second electrode (a segment electrode) 16 can be located on the first and second transparent substrates 11 and 15, respectively. The first transparent substrate 11 and the second transparent substrate 15 can be located so that the first electrode 12 faces the second electrode 16, and can be attached to each other while they keep a prescribed interval (e.g. 4 micrometers) with respect to each other.

The first electrode 12 can be located on a surface of the first transparent substrate 11 and can be configured to form a desirable pattern with a transparent conductive layer such as ITO and the like. The first electrode 12 can be connected to a first wiring line as described in detail later. The second electrode 16 can be located on a surface of the second transparent substrate 15 and can be configured to form a desirable pattern with a transparent conductive layer such as ITO and the like that is similar to or identical with the first electrode 12. The second electrode 16 can be connected to a second wiring line as also described in detail later.

An oriented film 13 can be disposed on the surface of the first transparent substrate 11 so as to cover the first electrode 12 therewith. The oriented film 13 can control an oriented state when a liquid crystal molecule of the liquid crystal layer 14 is in an initial state, that is, when the power supply is not applied to the liquid crystal layer 14. The exemplary embodiment can employ the oriented film 13 that allows controlling the initial state of the liquid crystal molecule of the liquid crystal layer 14 as a vertical orientation (a vertical oriented film). In addition, a rubbing treatment can be dispensed on the oriented film 13 so as to create a pretilt angle of approximately 89.5 degrees with respect to the liquid crystal layer 14.

An oriented film 17 can be disposed on the surface of the second transparent substrate 15 so as to cover the second electrode 16 therewith. The oriented film 17 can control an oriented state of the liquid crystal layer 14 as the oriented film 13. The exemplary embodiment can also employ the vertical oriented film as the oriented film 17. In addition, a rubbing treatment can also be dispensed on the oriented film 17 so as to create a pretilt angle of approximately 89.5 degrees with respect to the liquid crystal layer 14, and the oriented film 17 can be disposed so as to form an anti-parallel orientation between the oriented films 13 and 17.

The liquid crystal layer 14 can be disposed between the first electrode 12 of the first transparent substrate 11 and the second electrode 16 of the second transparent substrate 15. In the exemplary embodiment, the liquid crystal layer 14 can be configured with a liquid crystal material, of which a dielectric constant anisotropy $\Delta$ is negative. Specifically, the dielectric constant anisotropy $\Delta$ is -2.6, a refractive anisotropy $\Delta n$ is 0.20 and a relative permittivity is 5.1.

Solid lines shown in the liquid crystal layer 14 of FIG. 8 can indicate an orientation direction of the liquid crystal molecule at the initial state when the power supply is not applied to the liquid crystal layer 14. Therefore, the liquid crystal layer 14 of the exemplary embodiment can be arranged in a vertical alignment mode, in which the orientation direction of the liquid crystal molecule at the initial state can be substantially perpendicular to the surfaces of the first and second transparent substrates 11 and 15.

A first polarizer 21 can be located on an opposite surface of the surface including the first electrode 12, and a second polarizer 22 can be located on an opposite surface of the surface including the second electrode 16. An absorption axis of the first polarizer 21 can be located at 45 degrees, and an absorption axis of the second polarizer 22 can be located at 135 degrees. An optical compensator 23 can be located between the first polarizer 21 and the first transparent substrate 11 or between the second polarizer 22 and the second transparent substrate 15. The optical compensator 23 can be laminated with two plates, in which a retardation ΔRe in an in-plane direction is 0 nanometers and a retardation ΔRth in a thickness direction is 220 nanometers.

Figure 9:
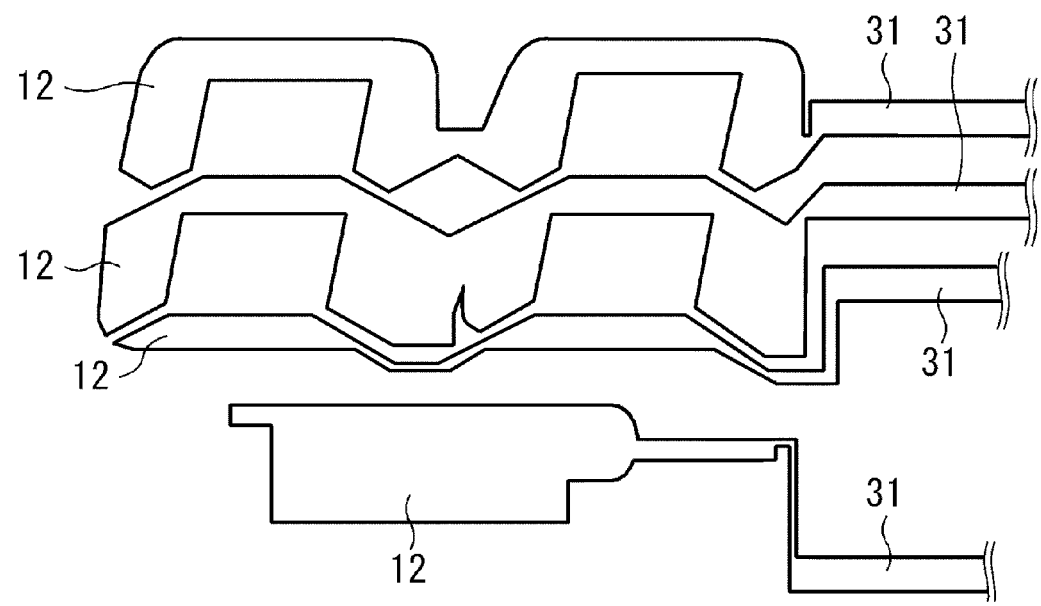
FIG. 9 is a partial close-up top view showing a structure of a first electrode and a first wiring line in the exemplary embodiment of FIG. 7.
Figure 10:
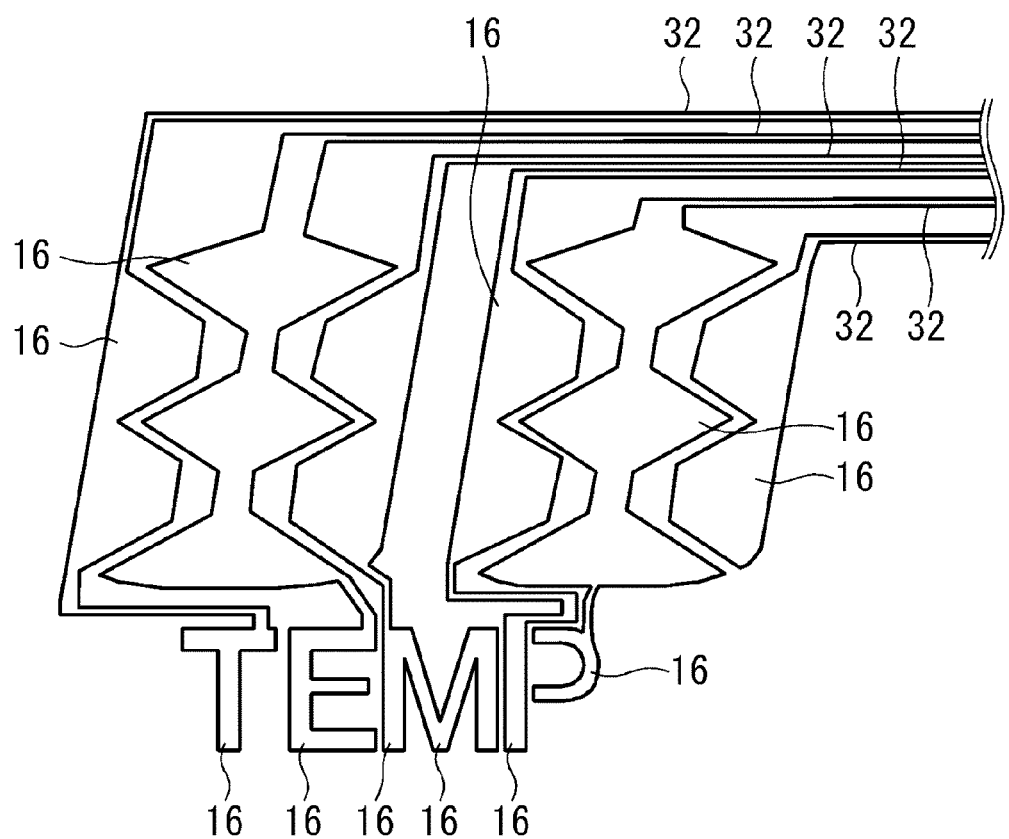
FIG. 10 is a partial close-up top view showing a structure of a second electrode and a second wiring line in the exemplary embodiment of FIG. 7.

In the LCD apparatus of the exemplary embodiment, a structure of the first electrode, a first wiring line, the second electrode and a second wiring line will now be described in detail. FIG. 9 is a partial close-up top view showing a structure of the first electrode 12 and the first wiring line 31 in the exemplary embodiment of FIG. 7. FIG. 10 is a partial close-up top view showing a structure of the second electrode 16 and the second wiring line 32. The partial views show the structure of display segments "88" and "TEMP", which are located on a left side in the display area 2 of the LCD apparatus 1 shown in FIG. 7.

As shown in FIG. 9, the first electrode 12 for the common electrode can be connected to the first wiring line 31. The first wiring line 31 can be formed by patterning the transparent conductive layer such as ITO along with the first electrode 12. The first wiring line 31 can each be located so as not to contact with respect to each other and can extend from the first wiring line 31 to the terminal portion 4 shown in FIG. 7.

The second electrode 16 for the segment electrode can be connected to the second wiring line 32 as shown in FIG. 10. The second wiring line 32 can be formed by patterning the transparent conductive layer such as ITO along with the second electrode 16. The second wiring line 32 can also each be located so as not to contact with respect to each other and can extend from the second electrode 16 toward the above-described terminal portion 4.

Figure 11:
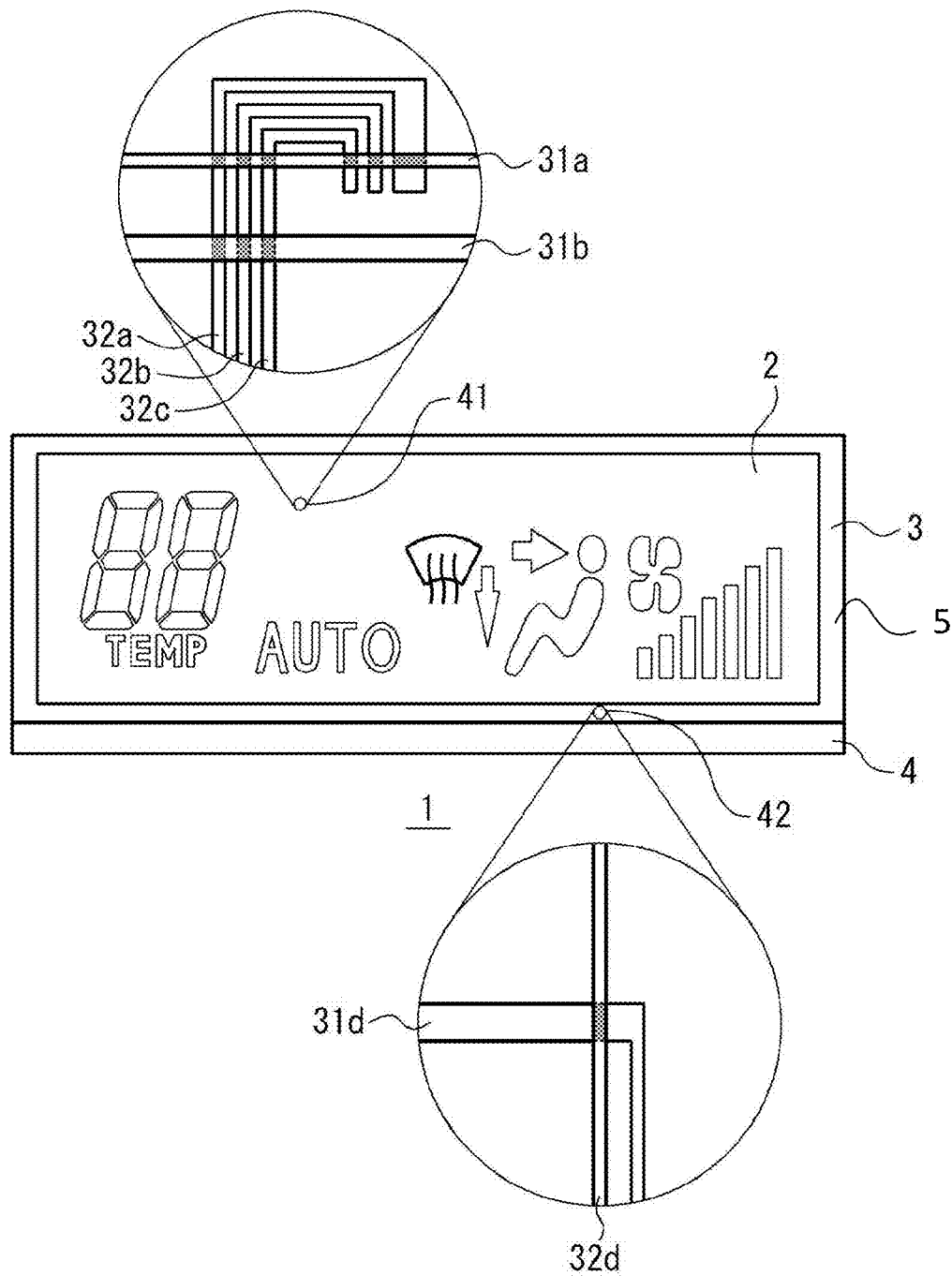
FIG. 11 is a partial close-up top view showing a structure of the first wiring line and the second wiring line of the exemplary embodiment of FIG. 7.

FIG. 11 is a partial close-up top view showing a structure of the first wiring line 31 and the second wiring line 32 in the exemplary embodiment of FIG. 7. As in a general LCD apparatus, in the LCD apparatus 1 of the exemplary embodiment, the first wiring line 31 and the second wiring line 32 can be located so as not to intersect with respect to each other. However, as shown FIG. 11, the LCD apparatus 1 of the exemplary embodiment can include a structure in which the first wiring line 31 partially intersects with the second wiring line 32.

These above described partial intersections can be included in the display area 2. Specifically, the structure in which the first wiring line 31 partially intersects with the second wiring line 32 can be provided in a region 41 that is a part of the display area 2. Here, in FIG. 11, each of two first wiring lines 31 is respectively marked with 31a, 31b for convenience, and each of three second wiring lines 32 is marked with 32a, 32b and 32c, respectively. In the partial close-up top view of FIG. 11, the structure of the first wiring lines 31a-31b and the second wiring lines 32a-32c is shown in the region 41.

As shown in the close-up view, the first wiring line 31a can intersect with the second wiring lines 32a, 32b and 32c. The second wiring lines 32a-32c can be shaped as inverted U-shapes, and therefore can respectively intersect with the first wiring line 31a at two points. The intersecting points are marked with a gray scale in the close-up view, and the first wiring line 31a can include six intersecting regions.

Consequently, because a compensation capacity can be added to the first electrode 12 connecting to the first wiring 31a via the six intersecting regions, a whole impedance of the first electrode 12 and the first wiring line 31a can be adjusted by the intersecting regions. That is to say, the intersecting regions can correspond to an increase of the display area connecting to the first wiring line 31a in accordance with the above-described prospective research.

In addition, the first wiring line 31b can also intersect with the second wiring lines 32a, 32b and 32c. Because a compensation capacity can be added to another first electrode connecting to the first wiring line 31b via the three intersecting regions, a whole impedance of the other first electrode and the first wiring line 31b can be adjusted by the three intersecting regions. The first wiring lines 31a and 32b can be different from the respective numbers of the intersecting regions. Thus, the compensation capacity can be adjusted by adjusting the number of the intersecting regions.

Here, when the intersecting region is located in the display area 2, the intersecting region may be visible if its size is large. When there is no problem with regard to design characteristics of the display area 2, its size may be ignored. However, when the intersecting region on the display area 2 may be considerable, the visibility can be extremely reduced by a method described later.

Figure 12:
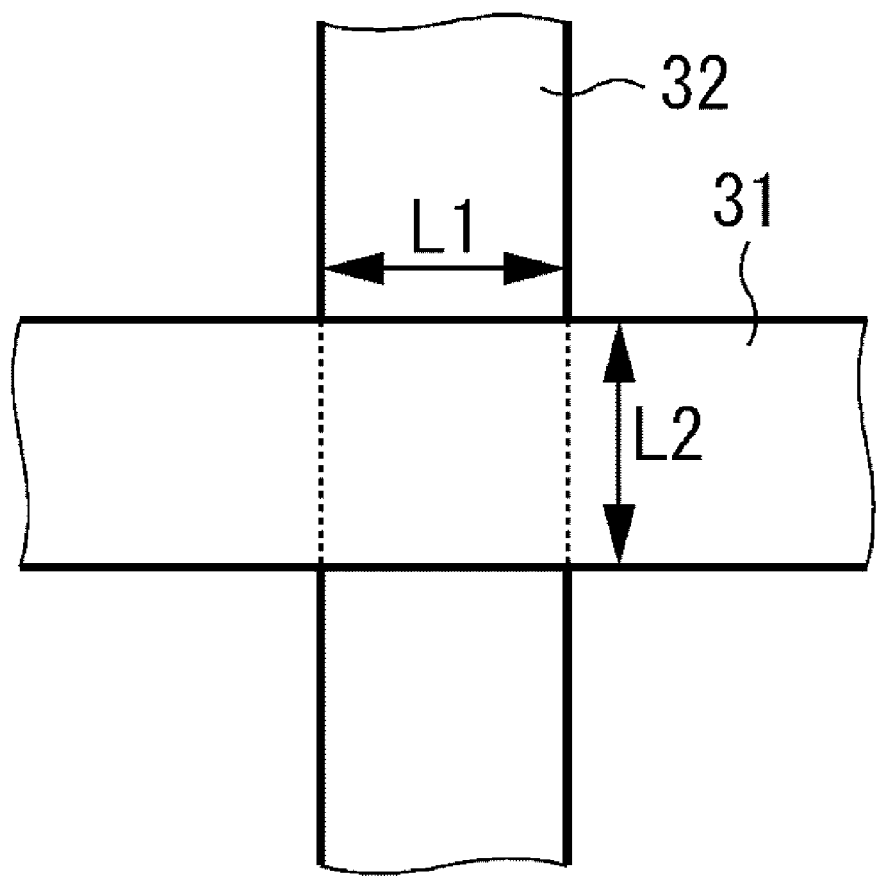
FIG. 12 is a partial close-up top view showing an exemplary intersecting region of the first wiring line and the second wiring line in the exemplary embodiment of FIG. 7.
Figure 13:
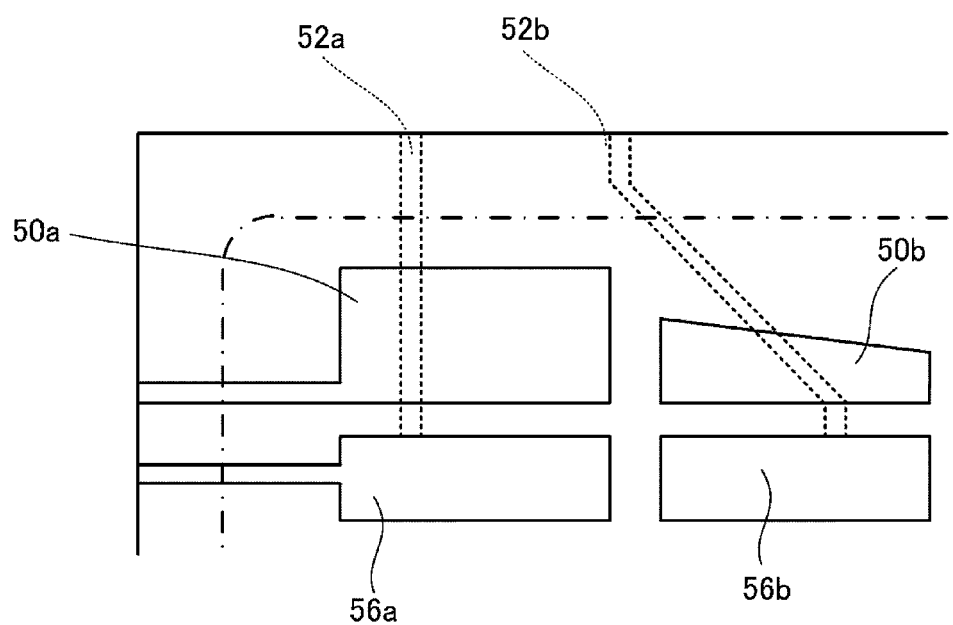
FIG. 13 is a partial close-up top view showing a conventional LCD apparatus.

FIG. 12 is a partial close-up top view showing an exemplary intersecting region of the first wiring line 31 and the second wiring line 32. The exemplary intersecting region shown in FIG. 12 is a rectangular shape, in which a length is L1 and another length is L2. In this case, at least one of L1 and L2 can be less than 100 micrometers. When the at least one of L1 and L2 is less than 100 micrometers, the visibility of the intersecting region can be reduced. When both L1 and L2 are less than 100 micrometers, the visibility of the intersecting region can be furthermore reduced. This is because visual ability of the human eye is approximately 100 micrometers.

In addition, the intersecting region of the first wiring line 31 and the second wiring line 32 can be located at a region 42 on the non-display area 3 as shown in FIG. 11. The partial enlarged top view of the region 42 is shown in FIG. 11. The non-display area 3 of the disclosed subject matter can include: the first transparent substrate 11; a first wiring line 31d; the liquid crystal 14; a second wiring line 32d; and the second transparent substrate 15.

However, the non-display area 3 can be located at a peripheral portion of the LCD apparatus 1, and therefore the non-display area 3 can be easily shielded with a shield mask 5 such as a case, a cover and the like so that the above-described intersecting regions are not recognizable or difficult to recognize. When the intersecting region of the first wiring line 31 and the second wiring line 32 may be located on this non-display area 3 which serves as the above-described region, the size of the intersecting region may not necessarily be limited due to its not being externally visible.

When a large intersecting region is located in the display area 2, the shield mask 5 such as a black mask and the like can be located on the first transparent substrate 11 and/or the second transparent substrate 15 so as to cover the intersecting region. The black mask can be formed by a printing method, spattering method, etc. The black mask may result in a good visual quality of the LCD apparatus 1, if the black mask can be appropriately designed in accordance with a usage of the LCD apparatus, a field of the use, and so on.

The intersecting region has been described as a rectangular shape, however, it cannot be limited to this rectangular shape. Various shapes such as a trapezoid, a circle, an ellipse, non-symmetrical shapes, and the like can used for the intersecting region in accordance with a desirable area, a vacant space, and the like on the transparent substrates 11 and 15. In this case, each maximum width of the first wiring lines 31a-31b and the second wiring lines 32a-32d in intersecting regions of the first wiring lines 31a-31b and the second wiring lines 32a-32d can be substantially less than 100 micrometers due to the above-described reason.

According to the disclosed subject matter, the capacity can be formed in the intersecting region of the first wiring line 31 and the second wiring line 32, and thereby the impedance between the first electrode 12 connecting to the wiring line 31 and the second electrode 16 connecting to the second wiring line 32 can be adjusted so that each of the effective voltages applied to the display patterns can become substantially the same voltage. Thus, the LCD apparatus can result in a high visual quality with a simple structure.

In this case, a width of the first wiring line 31 can change between both ends of the first wiring line 31, and thereby the resistance value between both ends of the first wiring line 31 can change. In this case, the wider the width of the first wiring line 31 is, the lower the resistance value of the first wiring line 31 is. On the other hand, the narrower the width of the first wiring line 31 is, the higher the resistance value of the first wiring line 31 is.

Similarly, a width of the second wiring line 32 can also change between both ends of the second wiring line 32, and thereby the resistance value between both ends of the second wiring line 32 can also change. Thus, each of the effective voltages applied to the display patterns can be adjusted by adjusting not only the above-described intersecting area but also the respective impedances of the first wiring lines 31 and the second wiring line 32.

Thus, when a block of the display patterns needs to be highlighted in the display area 2 (e.g. a warning sign), the block of the display patterns can be configured at a higher voltage than that of other display patterns. In this case, the block of the display patterns can also be highlighted by the above-described method and with a collar filter and the like if necessary. Thus, the disclosed subject matter can provide LCD apparatus having a high visual quality that can perform a premium accent with a simple structure, and which can be driven by a simple driving circuit as usual.

Various modifications of the above disclosed embodiments can be made without departing from the spirit and scope of the presently disclosed subject matter. For example, the liquid crystal layer of the vertical alignment type is described as the exemplary embodiment. However, the disclosed subject matter is not limited to the vertical alignment type, and can also be configured with a twisted nematic type including a super-twisted nematic type and, other liquid crystal types. Furthermore, in the above-described exemplary embodiment, the segment type LCD apparatus is referenced. However, the disclosed subject matter is not limited to the segment type LCD apparatus alone, but can be used for the character type LCD apparatus, the graphic type LCD apparatus and so on.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. An LCD apparatus including a non-display area adjacent a display area, comprising:
   a first transparent substrate having a first surface;
   a plurality of first electrodes and a plurality of first wiring lines, the plurality of first electrodes arranged within the display area located on the first surface of the first transparent substrate, each of the first electrodes connecting to a respective one of the plurality of first wiring lines, and each of the first wiring lines extending to the non-display area located on the first surface of the first transparent substrate and configured to receive voltage;
   a second transparent substrate having a second surface, and the second transparent substrate being located so that the second surface faces the first surface of the first transparent substrate;
   a plurality of second electrodes and a plurality of second wiring lines, the plurality of second electrodes arranged within the display area located on the second surface of the second transparent substrate, each of the second electrodes connecting to a respective one of the plurality of second wiring lines, and each of the second wiring lines extending to the non-display area located on the second surface of the second transparent substrate and configured to receive the voltage along with a corresponding first wiring line; and
   a liquid crystal layer disposed between the first surface of the first transparent substrate and the second surface of the second transparent substrate, the liquid crystal layer disposed between the plurality of first electrodes of the first transparent substrate and the plurality of second electrodes of the second transparent substrate forming at one display pattern within the display area, wherein at least one of the first wiring lines at least partially intersects with at least one of the second wiring lines, the liquid crystal layer is also disposed between at least one intersecting region of the first wiring lines and the second wiring lines, and thereby an impedance of the at least one of the first wiring lines varies as compared with impedance where the at least one of the first wiring lines at least partially does not intersect with the at least one of the second wiring lines.

2. The LCD apparatus including a non-display area adjacent a display area according to claim 1, wherein the at least one intersecting region of the first wiring lines and the second wiring lines is located on the display area, and a shape of the at least one intersecting region is substantially a rectangular shape in which at least one of four sides is less than 100 micrometers.

3. The LCD apparatus including a non-display area adjacent a display area according to claim 1, wherein the at least one intersecting region of the first wiring lines and the second wiring lines is located on the non-display area.

4. The LCD apparatus including a non-display area adjacent a display area according to claim 1, further comprising:
   a shield mask located over the at least one intersecting region of the first wiring lines and the second wiring lines and adjacent at least one of the first transparent substrate and the second transparent substrate.

5. The LCD apparatus including a non-display area adjacent a display area according to claim 1, wherein the voltage is a passive matrix driving voltage.

6. The LCD apparatus including a non-display area adjacent a display area according to claim 2, wherein the voltage is a passive matrix driving voltage.

7. The LCD apparatus including a non-display area adjacent a display area according to claim 1, wherein the liquid crystal layer is configured as a segment type display.

8. The LCD apparatus including a non-display area adjacent a display area according to claim 2, wherein the liquid crystal layer is configured as a segment type display.

9. An LCD apparatus, comprising:
   a first transparent substrate having a first surface and a first peripheral region, the first peripheral region located on the first surface of the first transparent substrate, and the first transparent substrate including a plurality of first electrodes located on the first surface;

a plurality of first wiring lines each having a first node, a first terminal, and a first width, each of the first nodes connecting to a respective one of the first electrodes of the first transparent substrate, and each of the first terminals extending to the first peripheral region of the first transparent substrate and configured to receive voltage;

a second transparent substrate having a second surface and a second peripheral region, the second peripheral region located on the second surface of the second transparent substrate, the second transparent substrate including a plurality of second electrodes located on the second surface, and the second transparent substrate being located so that the second surface faces the first surface of the first transparent substrate;

a plurality of second wiring lines each having a second node, a second terminal, and a second width, each of the second nodes connecting to a respective one of the second electrodes, and each of the second terminals extending to the second peripheral region of the second transparent substrate and configured to receive the voltage along with a corresponding first wiring line; and a liquid crystal layer disposed between the first surface of the first transparent substrate and the second surface of the second transparent substrate, the liquid crystal layer disposed between the plurality of first electrodes of the first transparent substrate and the plurality of second electrodes of the second transparent forming at least one display pattern within the display area, wherein at least one of the first wiring lines at least partially intersects with at least one of the second wiring lines, the liquid crystal layer is also disposed between at least one intersecting region of the first wiring lines and the second wiring lines, and thereby an impedance of the at least one of the first wiring lines varies as compared with impedance where the at least one of the first wiring lines at least partially does not intersect with the at least one of the second win lines, and therefore an effective voltage applied between at least one of the first electrodes connected to the at least one of the first wiring lines and at least one of the second electrodes connected to at least one of the second wiring lines corresponding to the at least one of the first wiring lines is substantially equal to another effective voltage applied between another one of the first electrodes and another one of the second electrodes.

10. The LCD apparatus according to claim 9, wherein a maximum first width of the at least one of the first wiring lines and a maximum second width of the at least one of the second wiring lines in the at least one intersecting region of the first wiring lines and the second wiring lines is substantially less than 100 micrometers.

11. The LCD apparatus according to claim 9, wherein the first width of the at least one of the first wiring lines changes between the first node of the at least one of the first wiring lines and a corresponding first terminal, and the second width of the at least one of the second wiring lines changes between the second node of the at least one of the second wiring lines and a corresponding second terminal.

12. The LCD apparatus according to claim 10, wherein the first width of the at least one of the first wiring lines changes between the first node of the at least one of the first wiring lines and a corresponding first terminal, and the second width of the at least one of the second wiring lines changes between the second node of the at least one of the second wiring lines and a corresponding second terminal.

13. The LCD apparatus according to claim 9, further comprising:
a shield mask located over the at least one intersecting region of the first wiring lines and the second wiring lines and adjacent at least one of the first transparent substrate and the second transparent substrate.

14. The LCD apparatus according to claim 11, further comprising:
a shield mask located over the at least one intersecting region of the first wiring lines and the second wiring lines and adjacent at least one of the first transparent substrate and the second transparent substrate.

15. The LCD apparatus according to claim 9, wherein the voltage is a passive matrix driving voltage.

16. The LCD apparatus according to claim 10, wherein the voltage is a passive matrix driving voltage.

17. The LCD apparatus according to claim 9, wherein the liquid crystal layer is configured as a segment type display.

18. The LCD apparatus according to claim 10, wherein the liquid crystal layer is configured as a segment type display.

19. The LCD apparatus according to claim 9, wherein the liquid crystal layer is configured as a vertical alignment type.

20. The LCD apparatus according to claim 9, wherein the liquid crystal layer is configured as a twisted nematic type.

* * * * *